(12) United States Patent
Ge et al.

(10) Patent No.: US 11,994,762 B2
(45) Date of Patent: May 28, 2024

(54) LIQUID CRYSTAL HANDWRITING BOARD, HANDWRITING DEVICE, AND METHOD FOR CONTROLLING HANDWRITING DEVICE

(71) Applicants: Beijing BOE Optoelectronics Technology Co., Ltd., Beijing (CN); BOE Technology Group Co., Ltd., Beijing (CN)

(72) Inventors: Yang Ge, Beijing (CN); Yu Zhao, Beijing (CN); Xiaojuan Wu, Beijing (CN); Jiaxing Wang, Beijing (CN); Xian Wang, Beijing (CN); Huairui Yue, Beijing (CN); Jianwei Ma, Beijing (CN); Hailong Wang, Beijing (CN); Dawei Feng, Beijing (CN); Hao Yan, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/802,744

(22) PCT Filed: Oct. 14, 2021

(86) PCT No.: PCT/CN2021/123853
§ 371 (c)(1),
(2) Date: Aug. 26, 2022

(87) PCT Pub. No.: WO2022/105490
PCT Pub. Date: May 27, 2022

(65) Prior Publication Data
US 2023/0134866 A1   May 4, 2023

(30) Foreign Application Priority Data
Nov. 18, 2020   (CN) .......................... 202011293671.3

(51) Int. Cl.
*G02F 1/1333*   (2006.01)
*G02F 1/133*   (2006.01)
(Continued)

(52) U.S. Cl.
CPC ...... *G02F 1/13338* (2013.01); *G02F 1/13306* (2013.01); *G02F 1/133357* (2021.01);
(Continued)

(58) Field of Classification Search
CPC ........... G02F 1/13338; G02F 1/133357; G02F 1/13306; G02F 1/1339
See application file for complete search history.

(56) References Cited

U.S. PATENT DOCUMENTS

| | | | | |
|---|---|---|---|---|
| 2001/0015723 | A1* | 8/2001 | Kwok | G09G 3/3629 345/204 |
| 2001/0038127 | A1* | 11/2001 | Yamazaki | G02F 1/13452 257/E29.151 |

(Continued)

FOREIGN PATENT DOCUMENTS

| | | |
|---|---|---|
| CN | 107820582 A | 3/2018 |
| CN | 112327546 A | 2/2021 |

(Continued)

*Primary Examiner* — Lucy P Chien
(74) *Attorney, Agent, or Firm* — IPro, PLLC

(57) ABSTRACT

Provided is a liquid crystal handwriting board. The liquid crystal handwriting board includes: a liquid crystal panel, and a drive assembly electrically connected to the liquid crystal panel; wherein the liquid crystal panel includes: a first substrate and a second substrate that are opposite to each other, and a liquid crystal layer disposed between the first substrate and the second substrate; and the drive assembly is configured to apply, based on position information of a region to be erased, a pixel voltage to a pixel electrode in the region to be erased in the case that the liquid crystal handwriting board is in an erasing mode, such that a voltage
(Continued)

difference is developed between the pixel electrode in the region to be erased and the common electrode.

18 Claims, 4 Drawing Sheets

(51) Int. Cl.
    *G02F 1/1339*     (2006.01)
    *G02F 1/1343*     (2006.01)
    *G02F 1/1362*     (2006.01)
    *G02F 1/1368*     (2006.01)

(52) U.S. Cl.
    CPC ...... *G02F 1/1339* (2013.01); *G02F 1/134309* (2013.01); *G02F 1/136286* (2013.01); *G02F 1/1368* (2013.01)

(56) References Cited

U.S. PATENT DOCUMENTS

2002/0097364 A1*   7/2002   Kwon .................. G02F 1/1368
                                                              349/139
2018/0143475 A1     5/2018   Li
2020/0142581 A1     5/2020   Li et al.

FOREIGN PATENT DOCUMENTS

| IN | 112180628 A | 1/2021 |
|---|---|---|
| WO | 2017223374 A1 | 12/2017 |
| WO | 2019227942 A1 | 12/2019 |
| WO | 2020000767 A1 | 1/2020 |

* cited by examiner

LIQUID CRYSTAL HANDWRITING BOARD, HANDWRITING DEVICE, AND METHOD FOR CONTROLLING HANDWRITING DEVICE

CROSS-REFERENCE TO RELATED APPLICATION

This application is a U.S. national stage of international application No. PCT/CN2021/123853, filed on Oct. 14, 2021, which claims priority to Chinese Patent Application No. 202011293671.3 filed on Nov. 18, 2020 and entitled "LIQUID CRYSTAL HANDWRITING PAD HANDWRITING DEVICE, AND METHOD FOR CONTROLLING HANDWRITING DEVICE," and the disclosures of which are herein incorporated by references in their entireties.

TECHNICAL FIELD

The present disclosure relates to the field of display technologies, and in particular, relates to a liquid crystal handwriting board, a handwriting board device, and a method for controlling a handwriting board device.

BACKGROUND

A handwriting board is an electronic device for achieving word writing and drawing. A liquid crystal handwriting board has a less power consumption and clear writing, and thus occupies a greater market share in recent years. However, the present liquid crystal handwriting board merely achieves entire plane erasing, and has a poor flexibility.

SUMMARY

Embodiments of the present disclosure provide a liquid crystal handwriting board, a handwriting board device, and a method for controlling a handwriting board device. The technical solutions are as follows.

According to some embodiments of the present disclosure, a liquid crystal handwriting board is provided. The liquid crystal handwriting board includes:

a liquid crystal panel, and a drive assembly electrically connected to the liquid crystal panel; wherein the liquid crystal panel includes: a first substrate and a second substrate that are opposite to each other, and a liquid crystal layer disposed between the first substrate and the second substrate, wherein the first substrate includes a plurality of bulk pixel electrodes, and the second substrate includes a planar common electrode; and the drive assembly is configured to apply, based on position information of a region to be erased, a pixel voltage to a pixel electrode in the region to be erased in the case that the liquid crystal handwriting board is in an erasing mode, such that a voltage difference is developed between the pixel electrode in the region to be erased and the common electrode.

In some embodiments, the first substrate further includes: a plurality of thin-film transistors electrically connected to the drive assembly, wherein the pixel electrode is electrically connected to at least one of the plurality of thin-film transistors.

In some embodiments, the thin-film transistor includes: a first electrode and a second electrode, wherein the first electrode includes a U-shaped structure, the second electrode includes a strip-shaped structure, one end of the second electrode is disposed within the U-shaped structure, and the other end of the second electrode is electrically connected to the pixel electrode.

In some embodiments, the first substrate further includes: a first base, wherein both the thin-film transistor and the pixel electrode are disposed on the first base; and the thin-film transistor further includes: a gate, an active layer pattern, and a gate insulation layer, wherein the gate is disposed on a side, proximal to the first base, of the active layer pattern, the gate insulation layer is disposed between the gate and the active layer pattern, both the first electrode and the second electrode are disposed on a side, distal from the first base, of the active layer pattern, and both the first electrode and the second electrode are in contact with the active layer pattern.

In some embodiments, the first substrate further includes: a data line and a gate line that are disposed on the first base and provided with extension directions intersected with each other, wherein the data line is electrically connected to the first electrode, the gate line is electrically connected to the gate, and both the data line and the gate line are electrically connected to the drive assembly.

In some embodiments, the first substrate further includes a secondary electrode line disposed on the first base and in a same layer as the gate line, wherein an extension direction of the secondary electrode line is consistent with the extension direction of the gate line.

In some embodiments, the first substrate further includes: a first planarization layer disposed on the thin-film transistor, wherein the pixel electrode is disposed on the first planarization layer and is in contact with the first planarization layer, a via hole is disposed in the first planarization layer, and the pixel electrode is electrically connected to the second electrode via the via hole.

In some embodiments, the first substrate further includes a second planarization layer disposed on the pixel electrode.

In some embodiments, the liquid crystal panel further includes a spacer disposed between the first substrate and the second substrate.

In some embodiments, the liquid crystal layer includes bistable liquid crystal molecules.

According to some embodiments of the present disclosure, a handwriting board device is provided. The handwriting board device includes:

above liquid crystal handwriting board, and a position determination assembly electrically connected to a drive assembly in the liquid crystal handwriting board;

wherein the position determination assembly is configured to acquire position information of a region to be erased in a liquid crystal panel in the liquid crystal handwriting board, and send the position information of the region to be erased to the drive assembly.

In some embodiments, the handwriting board device further includes a toggling switch electrically connected to the position determination assembly; wherein the toggling switch is configured to control switching of the liquid crystal handwriting board between an erasing mode and a writing mode; and the position determination assembly is further configured to stop acquiring the position information of the region to be erased in the liquid crystal panel in the case that the liquid crystal handwriting board is in the writing mode.

In some embodiments, the position determination assembly includes an infrared sensor.

According to some embodiments of the present disclosure, a method for controlling a handwriting board device is provided. The method is applicable to the handwriting board device according to any one of above embodiments, and includes:

acquiring, in the case that liquid crystal handwriting board is in an erasing mode, position information of a region to be erased in a liquid crystal panel in the liquid crystal handwriting board by a position determination assembly, and sending the position information of the region to be erased to a drive assembly; and applying, based on the position information of the region to be erased, a pixel voltage to a pixel electrode in the region to be erased by the drive assembly, such that a voltage difference is developed between the pixel electrode in the region to be erased and a common electrode.

In some embodiments, the method further includes: controlling the position determination assembly to stop acquiring the position information of the region to be erased in the liquid crystal panel in the case that the liquid crystal handwriting board is in a writing mode.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art still derives other drawings from these accompanying drawings without creative efforts.

DETAILED DESCRIPTION

For clearer descriptions of the objectives, technical solutions, and advantages in the present disclosure, the embodiments of the present disclosure are described in detail hereinafter in combination with the accompanying drawings.

Figure 1:
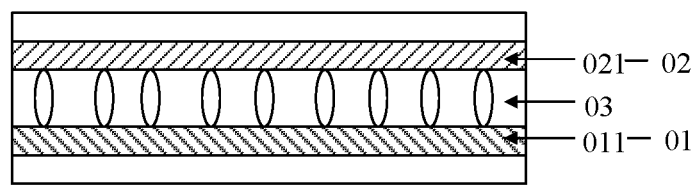
FIG. 1 is a structural diagram of film layers of a liquid crystal handwriting board known to the inventors.

Referring to FIG. 1, FIG. 1 is a structural diagram of film layers of a liquid crystal handwriting board known to the inventors. The liquid crystal handwriting board 00 generally includes: a first substrate 01 and a second substrate 02 that are opposite to each other, and a liquid crystal layer 03 disposed between the first substrate 01 and the second substrate 02. A planar electrode 011 is disposed on a side, proximal to the second substrate 03, of the first substrate 01, and a planar electrode 021 is disposed on a side, proximal to the first substrate 01, of the second substrate 02. Both the planar electrode 011 and the planar electrode 021 are entire plane electrodes.

In the case that the liquid crystal handwriting board 00 is in a writing mode, a part of liquid crystal molecules in the liquid crystal layer 03 reflect visible light under an action of an external pressure, and the liquid crystal handwriting board 00 displays a handwriting. In the case that the liquid crystal handwriting board 00 is in an erasing mode, the liquid crystal handwriting board 00 applies a voltage to the planar electrode 011 and the planar electrode 021 that are respectively disposed on two sides of the liquid crystal layer 03, such that a voltage difference is developed between the planar electrode 011 and the planar electrode 021, and the liquid crystal molecules in the liquid crystal layer 03 rearrange under the action of the voltage difference to erase the handwriting displayed on the liquid crystal handwriting board.

However, as both the planar electrode 011 in the first substrate 01 and the planar electrode 021 in the second substrate 02 are entire plane electrodes, all liquid crystal molecules in the liquid crystal layer 03 rearrange under the action of the voltage difference between the planar electrode 011 and the planar electrode 021 in the case that the liquid crystal handwriting board 00 is in the erasing mode, such that the liquid crystal handwriting board 00 merely achieves entire plane erasing, and the flexibility in use is poor.

Figure 2:
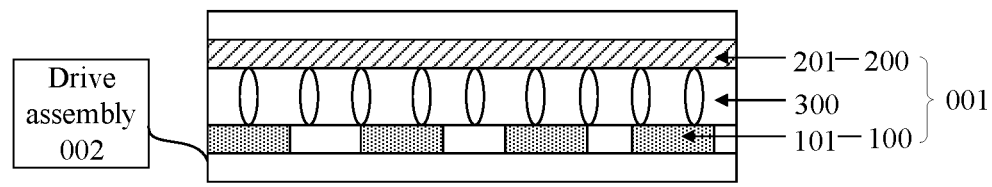
FIG. 2 is a schematic structural diagram of a liquid crystal handwriting board according to some embodiments of the present disclosure.

Referring to FIG. 2, FIG. 2 is a schematic structural diagram of a liquid crystal handwriting board according to some embodiments of the present disclosure. The liquid crystal handwriting board 000 includes:

a liquid crystal panel 001 and a drive assembly 002.

The liquid crystal panel 001 includes: a first substrate 100 and a second substrate 200 that are opposite to each other, and a liquid crystal layer 300 disposed between the first substrate 100 and the second substrate 200. The first substrate 100 includes a plurality of bulk pixel electrodes 101, and the second substrate 200 includes a planar common electrode 201. In some embodiments, the plurality of bulk pixel electrodes 101 are arranged in a matrix, and an orthogonal projection of the common electrode 201 on the first substrate 100 covers a region of the plurality of bulk pixel electrodes 101.

The drive assembly 002 is electrically connected to the liquid crystal panel 001, and is configured to apply, based on position information of a region to be erased, a pixel voltage to a pixel electrode 101 in the region to be erased in the case that the liquid crystal handwriting board 000 is in an erasing mode, such that a voltage difference is developed between the pixel electrode 101 in the region to be erased and the common electrode 201.

In summary, the liquid crystal handwriting board in the embodiments of the present disclosure includes: a liquid crystal panel and a drive assembly. The liquid crystal panel includes: a first substrate and a second substrate that are opposite to each other, and a liquid crystal layer disposed between the first substrate and the second substrate. As the pixel electrodes in the first substrate in the liquid crystal panel are a plurality of bulk electrodes, the drive assembly electrically connected to the liquid crystal panel applies, based on position information of a region to be erased, a pixel voltage to a pixel electrode in the region to be erased in the case that the liquid crystal handwriting board is in an erasing mode, such that a voltage difference is developed between the pixel electrode in the region to be erased and the common electrode. Thus, the liquid crystal molecules in the region to be erased in the liquid crystal layer rearrange under the action of the voltage difference. As such, a local region of the liquid crystal handwriting board is erased, and the flexibility of the liquid crystal handwriting board in use is improved.

In other way, in the case that the liquid crystal handwriting board is in the erasing mode, the liquid crystal handwriting board needs to apply a voltage to two inner planar electrodes. As both the two planar electrodes are entire planar electrodes, the liquid crystal handwriting board applies the voltage to the entire planar electrodes by enlarging a drive voltage, such that a power consumption of the liquid crystal handwriting board is increased, and a use life of the liquid crystal handwriting board is reduced.

Figure 3:
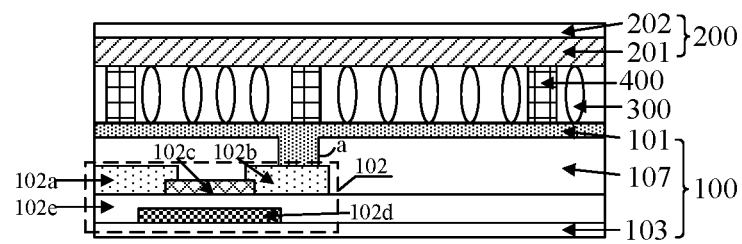
FIG. 3 is a schematic structural diagram of film layers of a liquid crystal panel in a liquid crystal handwriting board according to some embodiments of the present disclosure.

In the present disclosure, referring to FIG. 3, FIG. 3 is a schematic structural diagram of film layers of a liquid crystal panel in a liquid crystal handwriting board according to some embodiments of the present disclosure. The first substrate 100 in the liquid crystal panel 001 further includes a plurality of thin-film transistors 102 (TFT) electrically connected to the drive assembly 002. Each pixel electrode 101 is electrically connected to at least one of the plurality of thin-film transistors 102. As such, the drive assembly 002 selectively applies a pixel voltage to the pixel electrodes 101 in the liquid crystal panel 001 through the plurality of thin-film transistors 102, so as to apply the pixel voltage to the pixel electrodes 101 in part of regions in the liquid crystal panel 001, and erase the local region of the liquid crystal handwriting board 000 in the erasing mode. In addition, in the case that the liquid crystal handwriting board 000 is in the erasing mode, it is not necessary to apply the pixel voltage to all pixel electrodes 101 in the liquid crystal panel 001, and the pixel voltage applied to each pixel electrode 101 is generally less. Thus, the power consumption of the liquid crystal handwriting board 000 is efficiently reduced, and the use life of the liquid crystal handwriting board 000 is prolonged.

Figure 4:
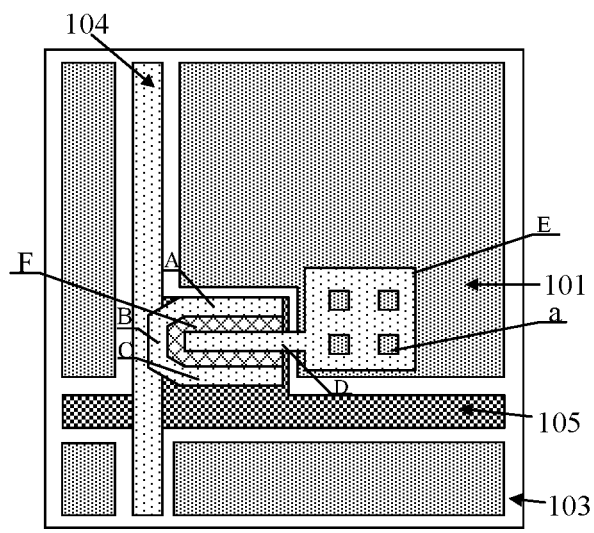
FIG. 4 is a top view of the liquid crystal panel in the liquid crystal handwriting board shown in FIG. 3 at a thin-film transistor region.

In some embodiments, referring to FIG. 3 and FIG. 4, FIG. 4 is a top view of the liquid crystal panel in the liquid crystal handwriting board shown in FIG. 3 at a thin-film transistor region. The thin-film transistor 102 includes a first electrode 102a and a second electrode 102b. The first electrode 102a is one of a source and a drain, and the second electrode 102b is the other of the source and the drain. The first electrode 102a includes a U-shaped structure, and the second electrode 102b includes a strip-shaped structure. One end of the second electrode 102b is disposed within the U-shaped structure in the first electrode 102a, and the other end of the second electrode 102b is electrically connected to the pixel electrode 101.

In some embodiments, as shown in FIG. 4, the first electrode 102a includes a first extension portion A, a second extension portion B, and a third extension portion C that are sequentially connected. An extension direction of the first extension portion A of the first electrode 102a is consistent with the extension direction of the third extension portion C of the first electrode 102a, and an extension direction of the second extension portion B of the first electrode 102a is perpendicular to the extension direction of the first extension portion A of the first electrode 102a and the extension direction of the third extension portion C of the first electrode 102a. As such, the first extension portion A, the second extension portion B, and the third extension portion C that are sequentially connected form the U-shaped structure of the first electrode 102a.

The second electrode 102b includes: a first connection portion D disposed between the first extension portion A of the first electrode 102a and the third extension portion C of the first electrode 102a, and a second connection portion E connected to the first connection portion D. The first connection portion D of the second electrode 102b is the strip-shaped structure in the second electrode 102b, and the second connection portion E of the second electrode 102b is in a bulk-shaped structure and is electrically connected to the pixel electrode 101.

In the embodiments of the present disclosure, as shown in FIG. 3 and FIG. 4, the thin-film transistor 102 further includes an active layer pattern 102c in contact with the first electrode 102a and the second electrode 102b. In the case that the first electrode 102a in the thin-film transistor 102 includes the U-shaped structure, and the second electrode 102b in the thin-film transistor 102 includes the strip-shaped structure with one end extending to the U-shaped structure, a channel region F of the active layer pattern 102c is a U-shaped channel region. It is noted that, the channel region F of the active layer pattern 102c refers to a region in the active layer pattern 102c where the active layer pattern 102c is in contact with the first electrode 102a, and a region between regions where the active layer pattern 102c is in contact with the second electrode 102b.

In the case that the channel region F of the active layer pattern 102c in the thin-film transistor 102 is the U-shaped channel region, the thin-film transistor 102 withstands a higher breakdown voltage due to a larger aspect ratio of the U-shaped channel region, such that the use life of the liquid crystal handwriting board 000 is further prolonged.

In some embodiments, the channel region F of the active layer pattern 102c includes two first strip regions with the same extension direction and the same length, and two second strip regions configured to connect the two first strip regions. A width of the first strip region is equal to a width of the second strip region. In the present disclosure, a length of the channel region F of the active layer pattern 102c is a sum of the lengths of the two first strip regions, and a width of the channel region F is a sum of the width of the first strip region and the width of the second strip region.

In some embodiments, an aspect ratio of the channel region F of the active layer pattern 102c is 50/4 μm. As such, the thin-film transistor 102 meets a current required to drive the pixel, and withstands the higher breakdown voltage.

In the embodiments of the present disclosure, referring to FIG. 3, the first substrate 100 further includes a first base 103. Both the thin-film transistor 102 and the pixel electrode 101 are disposed on the first base 103. The thin-film transistor 102 further includes: a gate 102d and a gate insulation layer 102e. The gate 102d is disposed on a side, proximal to the first base 103, of the active layer pattern 102c, and the gate insulation layer 102e is disposed between the gate 102d and the active layer pattern 102c. Both the first electrode 102a and the second electrode 102b are disposed on a side, distal from the first base 103, of the active layer pattern 102c, and both the first electrode 102a and the second electrode 102b are in contact with the active layer pattern 102c. That is, the thin-film transistor 102 is a bottom-gate thin-film transistor. In some embodiments, the thin-film transistor 102 is a top-gate thin-film transistor, which is not limited in the embodiments of the present disclosure.

In some embodiments, the first base 103 is a glass base.

Figure 5:
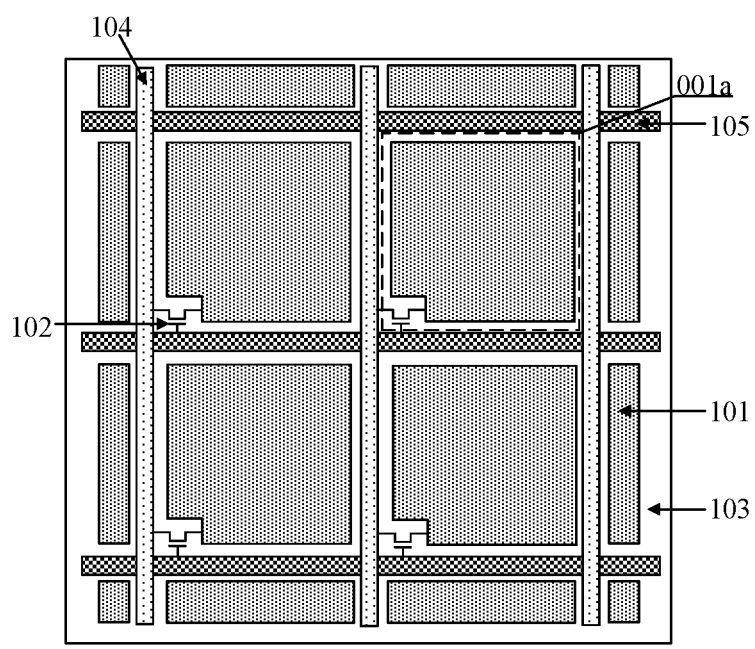
FIG. 5 is a top view of the liquid crystal panel in the liquid crystal handwriting board shown in FIG. 3.

In the present disclosure, as shown in FIG. 3 and FIG. 5, FIG. 5 is a top view of the liquid crystal panel in the liquid crystal handwriting board shown in FIG. 3. The first substrate 100 further includes a data line 104 and a gate line 105 that are disposed on the first base 103 and provided with extension directions intersected with each other. The data line 104 and the gate line 105 provided with extension directions intersected with each other define a plurality of pixel regions 001a in the liquid crystal panel 001. In some embodiments, any two adjacent data lines 104 and any two adjacent gate lines 105 form a pixel region 001a. Each pixel electrode 101 in the first substrate 100 is disposed in one pixel region 001a.

In some embodiments, the pixel region 001a is a rectangle region with a length and a width being 1 mm. As such, a dizzy sense of a user in viewing the liquid crystal panel is reduced, and a greater resolution of the liquid crystal panel 001 is ensured. In the case that the resolution of the liquid crystal panel 001 is greater, an area of a minimum erasable region (that is, the pixel region) of the liquid crystal handwriting board 000 is less, and thus a precision of erasing the liquid crystal handwriting board 000 is efficiently improved.

In the embodiments of the present disclosure, the data line 104 is electrically connected to the first electrode 102a in the thin-film transistors 102, and the gate line 105 is electrically connected to the gate 102d in the thin-film transistors 102. In some embodiments, the data line 104 is disposed in a same layer as the first electrode 102a and the second electrode 102b. That is, the data line 104, the first electrode 102a, and the second electrode 102b are formed by one pattern process. The gate line 105 is disposed in the same layer as the gate 102d. That is, the gate line 105 and the gate 102d are formed by one pattern process.

In some embodiments, a thickness between the data line 104 and the first electrode 102a and a thickness between the gate line 105 and the gate 102d range from 350 nm to 450 nm. In some embodiments, both the thickness between the data line 104 and the first electrode 102a and the thickness between the gate line 105 and the gate 102d are 400 nm. Both a material of the data line 104 and a material of the gate line 105 include metal materials, such as, aluminum, molybdenum, an alloy, or the like. As such, resistances of the data line 104 and the gate line 105 are reduced.

In the embodiments of the present disclosure, both the data line 104 and the gate line 105 are further electrically connected to the drive assembly 002. The drive assembly 002 includes a timing controller (TCON), a source driver, and a gate driver. In some embodiments, the timing controller is electrically connected to the source driver and the gate driver, the data line 104 in the liquid crystal panel 001 is electrically connected to the source driver, and the gate line 105 in the liquid crystal panel 001 is electrically connected to the gate driver.

A main function of the timing controller is to process the position information of the region to be erased, so as to determine positions of the pixel electrodes in the region to be erased, and generate corresponding data signals and control signals. The data signal is sent to the source driver, the source driver converts the received data signal to a pixel voltage, and the pixel voltage is written to a corresponding pixel region in the liquid crystal panel 001 through the data line 104. The control signal is sent to the gate driver, the gate driver converts the received control signal to a gate voltage, and the gate voltage is written to a corresponding pixel region in the liquid crystal panel 001 through the gate line 105. Thus, independent control over one pixel in the liquid crystal panel 001 is achieved.

In some embodiments, a width of the data line 104 and a width of the gate line 105 ranges from 8 μm to 12 μm. In some embodiments, both the width of the data line 104 and the width of the gate line 105 are 10 μm. As such, the resistances of the data line 104 and the gate line 105 are further reduced, a possibility of visible grid lines in the liquid crystal panel 001 due to reflection of the data line 104 and the gate line 105 is reduced, and a display effect of the liquid crystal handwriting board 000 is improved.

In some embodiments, pitches between the plurality of bulk pixel electrodes 101 range from 18 μm to 22 μm. In some embodiments, the pitches between the plurality of bulk pixel electrodes 101 are 20 μm. As such, pitches between the pixel electrode 101, and the data line 104 and gate line 105 are greater, and parasitical capacitors between the pixel electrode 101, and the data line 104 and gate line 105 are reduced.

Figure 6:
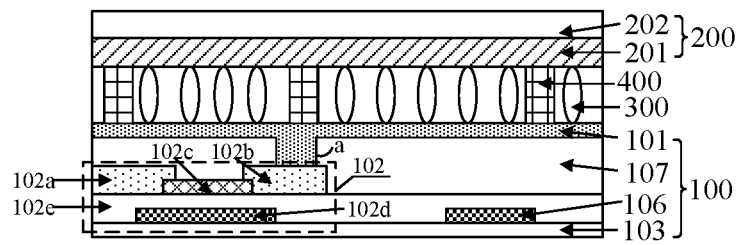
FIG. 6 is a schematic structural diagram of film layers of another liquid crystal panel in a liquid crystal handwriting board according to some embodiments of the present disclosure.
Figure 7:
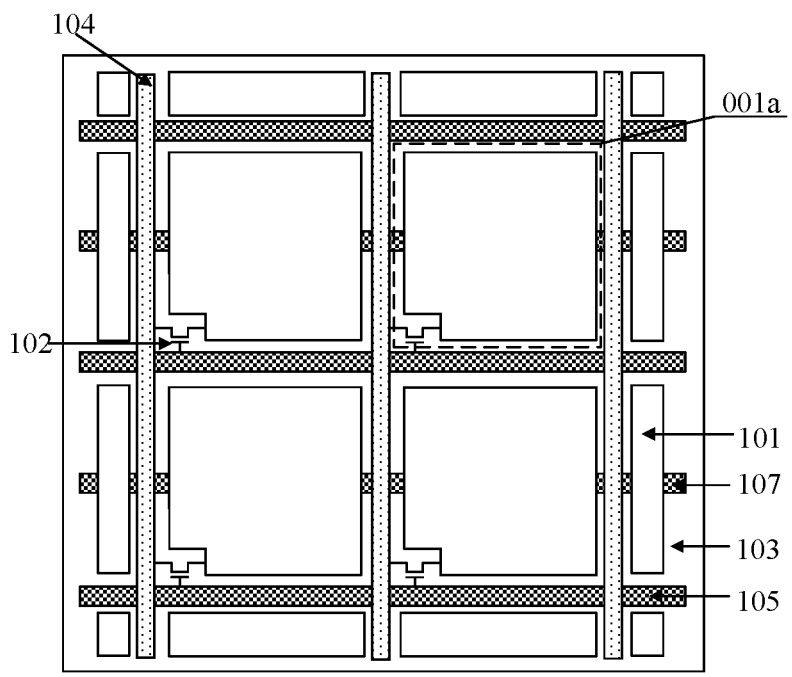
FIG. 7 is a top view of the liquid crystal panel in the liquid crystal handwriting board shown in FIG. 6.

In the embodiments of the present disclosure, referring to FIG. 6 and FIG. 7, FIG. 6 is a schematic structural diagram of film layers of another liquid crystal panel in a liquid crystal handwriting board according to some embodiments of the present disclosure, and FIG. 7 is a top view of the liquid crystal panel in the liquid crystal handwriting board shown in FIG. 6. The first substrate 100 further includes: a secondary electrode line 106 disposed on the first base 103 and in the same layer as the gate line 105. An extension direction of the secondary electrode line 106 is consistent with an extension direction of the gate line 105.

In some embodiments, the pixel electrodes 101 in the first substrate 100 are arranged in multiple rows, and a number of the secondary electrode lines 106 is equal to a number of rows of the pixel electrodes 101. An orthogonal projection of each secondary electrode line 106 on the first base 103 is overlapped with an orthogonal projection of a corresponding row of the pixel electrodes 101 on the first base 103, and the secondary electrode line 106 and each pixel electrode 101 in the corresponding row of the pixel electrodes 101 form a storage capacitor. The storage capacitor is configured to hold a charging voltage of the pixel electrode 101. Furthermore, the storage capacitor prevents a change of a voltage of the pixel region 001a being erased from affecting a voltage of surrounded pixel regions 001a, and thus, an effect on the display effect of the surrounded pixel regions 001a is avoided.

In some embodiments, referring to FIG. 3 and FIG. 6, the first substrate 100 further includes a first planarization layer 107 disposed on the thin-film transistor 102. The pixel electrode 101 is disposed on the first planarization layer 107 and is in contact with the first planarization layer 107, and a via hole a is disposed in the first planarization layer 107. The pixel electrode 101 is electrically connected to the second electrode 102b via the via hole a. The first planarization layer 107 is configured to protect the thin-film transistor 102.

Figure 8:
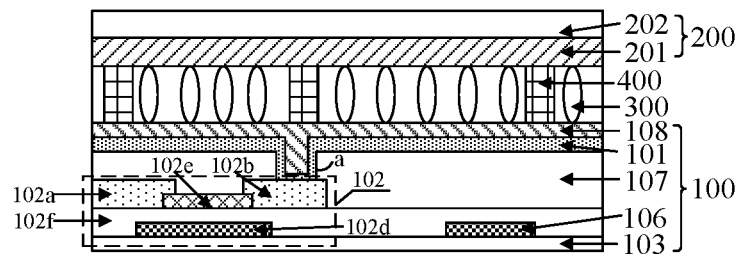
FIG. 8 is a schematic structural diagram of film layers of another liquid crystal panel in a liquid crystal handwriting board according to some embodiments of the present disclosure.

In the embodiments of the present disclosure, referring to FIG. 8, FIG. 8 is a schematic structural diagram of film layers of another liquid crystal panel in a liquid crystal handwriting board according to some embodiments of the present disclosure. The first substrate 100 further includes a second planarization layer 108 disposed on the pixel electrode 101. In the case that the first substrate 100 and the second substrate 200 are opposite to each other, a foreign material is present between the first substrate 100 and the second substrate 200 due to a dusty facility environment.

The second planarization layer 108 is configured to avoid the foreign material between the first substrate 100 and the second substrate 200, and conduct the pixel electrode 101 in the first substrate 100 and the common electrode 201 in the second substrate 200.

In the embodiments of the present disclosure, referring to FIG. 3, FIG. 6, and FIG. 8, the liquid crystal panel 001 further includes a spacer 400 disposed between the first substrate 100 and the second substrate 200. The spacer 400 is configured to separate the first substrate 100 from the second substrate 200, and the spacer 400 provides, due to an elasticity, an elastic deformation in the case that the liquid crystal handwriting board 000 experiences an external pressure. In addition, the spacer 400 functions as a support for the liquid crystal layer 300, such that an effect on an arrangement manner of the liquid crystal molecules in the liquid crystal layer 300 is avoided in the case that the liquid crystal panel 001 is pressed, and the display effect of the liquid crystal handwriting board 000 is improved.

In the embodiments of the present disclosure, the liquid crystal layer 300 includes bistable liquid crystal molecules. The bistable liquid crystal molecule has a planar texture status (a P status), a focal conic texture status (a FC status), and a hometropic texture status (a H status). The P status and the FC status are steady statuses, and are held without the voltage. The H status is a non-steady status, and is present in sustained applying of voltage. In the case that the liquid crystal handwriting board 000 experiences the external pressure, the bistable liquid crystal molecules in the liquid crystal layer 300 are converted to the P status under the action of the external pressure and reflect the visible light, and thus a region experiencing the external pressure in the liquid crystal panel 001 displays the handwriting. In the case that the drive assembly 002 in the liquid crystal handwriting board 000 applies the pixel voltage to the pixel electrode 101 in the region to be erased, a voltage difference is developed between the pixel electrode 101 in the region to be erased and the common electrode 201. The bistable liquid crystal molecules in the region to be erased are rearranged as the FC status under the action of the voltage difference, and does not reflect the visible light. In this case, the handwriting in the region to be erased is erased.

In the embodiments of the present disclosure, as shown in FIG. 3, FIG. 6, and FIG. 8, the second substrate 200 further includes a second base 202. The second base 202 is a flexible base, and a material of the second base 202 includes polyethylene terephthalate (PET). The common electrode 201 is disposed on the second base 202.

In summary, the liquid crystal handwriting board in the embodiments of the present disclosure includes: a liquid crystal panel and a drive assembly. The liquid crystal panel includes: a first substrate and a second substrate that are opposite to each other, and a liquid crystal layer disposed between the first substrate and the second substrate. As the pixel electrodes in the first substrate in the liquid crystal panel are a plurality of bulk electrodes, the drive assembly electrically connected to the liquid crystal panel applies, based on position information of a region to be erased, a pixel voltage to a pixel electrode in the region to be erased in the case that the liquid crystal handwriting board is in an erasing mode, such that a voltage difference is developed between the pixel electrode in the region to be erased and the common electrode. Thus, the liquid crystal molecules in the region to be erased in the liquid crystal layer rearrange under the action of the voltage difference. As such, a local region of the liquid crystal handwriting board is erased, and the flexibility of the liquid crystal handwriting board in use is improved.

A method for manufacturing a liquid crystal panel is further provided. The method for manufacturing the liquid crystal panel is used to manufacture the liquid crystal panel shown in FIG. 8. The method for manufacturing the liquid crystal panel includes the following steps.

In step A1, a first substrate is acquired by forming a gate pattern, a gate insulation layer, an active layer pattern, a source and drain pattern, a first planarization layer, a pixel electrode, and a second planarization layer on a first base.

In some embodiments, a gate layer is formed on the first base, and the gate pattern is formed by performing one pattern process on the gate layer. The gate pattern includes a gate, and a gate line and a secondary electrode line that are connected to the gate. In some embodiments, the first base is a glass base. A material of the gate pattern includes a metal material, such as, aluminum, molybdenum, an alloy, or the like. The gate line is used to apply a gate voltage to the gate.

Then, the gate insulation layer is formed on the first base with the gate pattern. The gate insulation layer is used to protect the gate line. In some embodiments, a material of the gate insulation layer includes a silicon dioxide, a silicon nitride, or a mixture of the silicon dioxide and the silicon nitride.

Then, an active material thin film is formed on the first base with the gate insulation layer, and the active layer pattern is formed by performing the one pattern process on the active material thin film. In some embodiments, a material of the active layer pattern includes polycrystalline silicon, amorphous silicon, or a semiconductor material such as an oxide semiconductor.

Then, a source and drain material layer is formed on the first base with the active layer pattern, and the source and drain pattern is formed by performing the one pattern process on the source and drain material layer. The source and drain pattern includes a first electrode, a second electrode, and a data line. The first electrode is one of a source and a drain, and the second electrode is the other of the source and the drain. In some embodiments, a material of the source and drain pattern includes aluminum.

Then, a planarization thin film is formed on the first base with the source and drain pattern, and the first planarization layer is formed by performing the one pattern process on the planarization thin film. The first planarization layer is used to protect the thin-film transistor. A via hole is disposed in the first planarization layer, and the subsequently formed pixel electrode is electrically connected to the second electrode via the via hole. In some embodiments, a material of the first planarization layer includes a silicon dioxide, a silicon nitride, or a mixture of the silicon dioxide and the silicon nitride.

Then, a first conductive thin film is formed on the first base with the first planarization layer, and a plurality of bulk pixel electrodes are formed by performing the one pattern process on the first conductive thin film. In some embodiments, materials of the plurality of pixel electrodes include transparent conductive materials, such as an indium tin oxide (ITO), an indium zinc oxide (IZO), or the like.

Eventually, a planarization thin film is formed on the first base with the pixel electrode, and a second planarization layer is formed by performing the one pattern process on the planarization thin film.

It is noted that the first substrate is formed by above processes. In some embodiments, it is further noted that the one pattern process in above embodiments includes: photoresist coating, exposing, developing, etching, and photoresist removing.

In some embodiments, in above processes, the two patterning processes of forming the active layer pattern and the source and drain pattern are combined to one pattern process by a halftone mask.

In step A2, a spacer and a sealant are formed on the first substrate.

In some embodiments, an organic thin film is formed on the second planarization layer in the first substrate, and the spacer is formed by performing the one pattern process on the organic thin film.

Then, the sealant is formed by coating a sealant material in a periphery of the first substrate with the spacer.

It is noted that in some embodiments, the one pattern process in above embodiments includes: photoresist coating, exposing, developing, etching, and photoresist removing.

In step A3, a second substrate is acquired by forming a common electrode on a second base.

In some embodiments, a second conductive thin film is formed on the second base, and the common electrode is formed by performing the one pattern process on the second conductive thin film.

In some embodiments, the second base is a flexible base, and a material of the second base includes PET. The common electrode is a plane electrode, and a material of the common electrode includes ITO or IZO.

It is noted that the second substrate is formed by above processes. It is further noted that the one pattern process in above embodiments includes: photoresist coating, exposing, developing, etching, and photoresist removing.

In step A4, a liquid crystal layer is formed by introducing a liquid crystal molecule into the sealant.

In some embodiments, the liquid crystal molecule includes bistable liquid crystal molecules.

In step A5, the second substrate covers the liquid crystal layer, such that the common electrode in the second substrate faces towards the first substrate, and the pixel electrode in the first substrate faces towards the second substrate.

It is noted that the liquid crystal panel in FIG. 8 is formed by steps A1 to A5.

Figure 9:
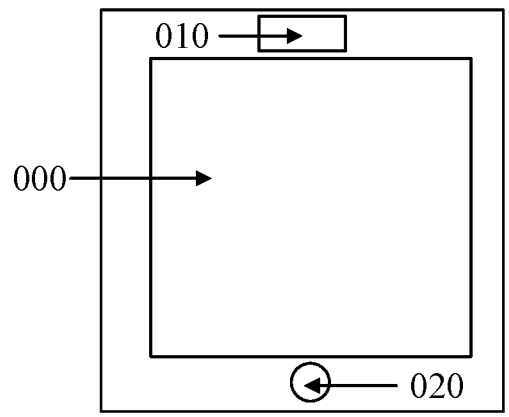
FIG. 9 is a schematic structural diagram of a handwriting board device according to some embodiments of the present disclosure.

A handwriting board device is further provided in the embodiments of the present disclosure. Referring to FIG. 9, FIG. 9 is a schematic structural diagram of a handwriting board device according to some embodiments of the present disclosure. The handwriting board device includes above liquid crystal handwriting board 000 and a position determination assembly 010. The position determination assembly 010 is electrically connected to a drive assembly in the liquid crystal handwriting board 000.

The position determination assembly 010 is configured to acquire position information of a region to be erased in a liquid crystal panel in the liquid crystal handwriting board 000, and send the position information of the region to be erased to the drive assembly.

As such, upon receiving position information of a region to be erased, the drive assembly applies, based on the position information of the region to be erased, a pixel voltage to a pixel electrode in the region to be erased, such that a voltage difference is developed between the pixel electrode in the region to be erased and the common electrode. Furthermore, the liquid crystal molecules in the region to be erased in the liquid crystal layer rearrange under the action of the voltage difference to erase the handwriting displayed on the region to be erased in the liquid crystal panel.

In the present disclosure, the position determination assembly 010 includes an infrared sensor. In the case that the liquid crystal handwriting board 000 is in an erasing mode, the infrared sensor emits an infrared signal to a display region of the liquid crystal handwriting board 000, so as to detect whether the display region of the liquid crystal handwriting board 000 includes an erasing tool, and determine position information of the erasing tool in the display region of the liquid crystal handwriting board 000. A position of the erasing tool in the display region of the liquid crystal handwriting board 000 is acted as a region to be erased in the liquid crystal handwriting board 000. In some embodiments, the erasing tool is an eraser.

In the embodiments of the present disclosure, the handwriting board device further includes a toggling switch 020. The toggling switch 020 is electrically connected to the position determination assembly 010. The toggling switch 020 is configured to control switching of the liquid crystal handwriting board 000 between the erasing mode and the writing mode. The position determination assembly 010 is further configured to stop acquiring the position information of the region to be erased in the liquid crystal panel in the case that the liquid crystal handwriting board 000 is in the writing mode.

In some embodiments, the handwriting board device further includes a controller electrically connected to the toggling switch 020 and the position determination assembly 010. The controller controls the position determination assembly 010 to be in an operation state or a non-operation state when receiving a control instruction from the toggling switch 020. In some embodiments, the controller controls the position determination assembly 010 to be in the operation state in the case that the controller receives a control instruction sent from the toggling switch 020 and configured to control the liquid crystal handwriting board 000 to be in the erasing mode. The controller controls the position determination assembly 010 to be in the non-operation state in the case that the controller receives a control instruction sent from the toggling switch 020 and configured to control the liquid crystal handwriting board 000 to be in the writing mode.

In the present disclosure, switching of the liquid crystal handwriting board 000 between the erasing mode and the writing mode is performed in many implementations, and the embodiments of the present disclosure illustrate by taking two possible implementations hereinafter as an example.

In a first possible implementation, the user taps the toggling switch 020, and the controller controls the position determination assembly 010 to be in the operation state, such that the liquid crystal handwriting board 000 is in the erasing mode. In this case, it is assumed that the user determines the position information of the erasing tool in the display region of the liquid crystal handwriting board 000 by the position determination assembly 010 in the case that the user performs the erasing operation on the liquid crystal handwriting board 000 through the erasing tool. The position of the erasing tool in the display region of the liquid crystal handwriting board 000 is acted as the region to be erased in the liquid crystal handwriting board 000. As such, the position information of the region to be erased is acquired by the position determination assembly 010. Then, the position determination assembly 010 sends the position information of the region to be erased to the drive assembly. As such, the drive assembly applies, based on the position information of the region to be erased, the pixel voltage to the pixel electrode in the region to be erased, such that a voltage difference is developed between the pixel electrode in the region to be erased and the common electrode. Furthermore, the liquid crystal molecules in the region to be erased in the liquid crystal layer rearrange under the action of the voltage difference to erase the handwriting displayed on the region to be erased in the liquid crystal panel.

In the case that the user taps the toggling switch 020 again, the controller controls the position determination assembly 010 to be in the non-operation state, such that the liquid crystal handwriting board 000 changes to the writing mode. In this case, the position determination assembly 010 stops acquiring the position information of the region to be erased in the liquid crystal panel, and the user writes on the liquid crystal handwriting board 000 through a writing tool (such as, a writing pen). A part of liquid crystal molecules in the liquid crystal layer 03 convert and reflect visible light under an action of an external pressure, and the liquid crystal handwriting board 000 displays the handwriting.

In a second possible implementation, the user taps the toggling switch 020, and the controller controls the position determination assembly 010 to be in the operation state, such that the liquid crystal handwriting board 000 is in the erasing mode. In this case, it is assumed that the user determines the position information of the erasing tool in the display region of the liquid crystal handwriting board 000 by the position determination assembly 010 in the case that the user performs the erasing operation on the liquid crystal handwriting board 000 through the erasing tool. The position of the erasing tool in the display region of the liquid crystal handwriting board 000 is acted as the region to be erased in the liquid crystal handwriting board 000. As such, the position information of the region to be erased is acquired by the position determination assembly 010. Then, the position determination assembly 010 sends the position information of the region to be erased to the drive assembly. As such, the drive assembly applies, based on the position information of the region to be erased, the pixel voltage to the pixel electrode in the region to be erased, such that a voltage difference is developed between the pixel electrode in the region to be erased and the common electrode. Furthermore, the liquid crystal molecules in the region to be erased in the liquid crystal layer rearrange under the action of the voltage difference to erase the handwriting board displayed on the region to be erased in the liquid crystal panel.

In the case that the position determination assembly 010 does not acquire the position information of the region to be erased within a predetermined duration, the controller controls the position determination assembly 010 to be in the non-operation state, such that the liquid crystal handwriting board 000 converts to the writing mode. In this case, the position determination assembly 010 stops acquiring the position information of the region to be erased in the liquid crystal panel, and the user writes on the liquid crystal handwriting board 000 through a writing pen. A part of liquid crystal molecules in the liquid crystal layer convert and reflect visible light under an action of an external pressure, and the liquid crystal handwriting board 000 displays the handwriting.

In some embodiments, the predetermined duration is one to five seconds.

In some embodiments, the erasing mode of the liquid crystal handwriting board 000 further includes an entire plane erasing mode. In some embodiments, the controller in the handwriting board device is further electrically connected to the drive assembly in the liquid crystal handwriting board 000. In the case that the controller receives a control instruction sent from the toggling switch 020 and configured to control the liquid crystal handwriting board 000 to be in the entire plane erasing mode, the controller sends a corresponding entire plane erasing instruction to the drive assembly, such that the drive assembly applies a pixel voltage to all pixel electrodes in the liquid crystal panel. Thus, voltage differences are developed between all pixel electrodes in the liquid crystal panel and the common electrode, and all liquid crystal molecules in the liquid crystal layer rearrange under the action of the voltage difference to erase the handwriting displayed on all regions in the liquid crystal panel.

It is noted that the control instruction configured to control the liquid crystal handwriting board 000 to be in the entire plane erasing mode is an instruction triggered when the user performs a long-press operation on the toggling switch 020.

It is further noted that in the case that the liquid crystal handwriting board 000 is in the entire plane erasing mode, it is necessary to control the position determination assembly 010 to stop acquiring the position information of the region to be erased in the liquid crystal panel.

In summary, the handwriting board device in the embodiments of the present disclosure controls switching of the liquid crystal handwriting board between the erasing mode and the writing mode by the toggling switch. The drive assembly electrically connected to the liquid crystal panel applies, based on the position information of the region to be erased acquired by the position determination assembly, the pixel voltage to the bulk pixel electrode in the region to be erased in the case that the liquid crystal handwriting board is in the erasing mode, such that a voltage difference is developed between the pixel electrode in the region to be erased and the common electrode. Thus, the liquid crystal molecules in the region to be erased in the liquid crystal layer rearrange under the action of the voltage difference. As such, a local region of the liquid crystal handwriting board is erased, and the flexibility of the liquid crystal handwriting board in use is improved.

Figure 10:
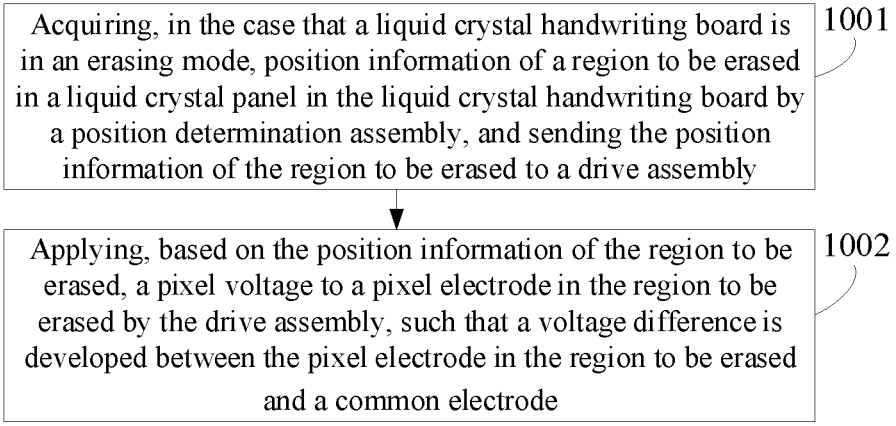
FIG. 10 is a flowchart of a method for controlling a handwriting board device according to some embodiments of the present disclosure.

A method for controlling a handwriting board device is further provided in the embodiments of the present disclosure. As shown in FIG. 10, FIG. 10 is a flowchart of a method for controlling a handwriting board device according to some embodiments of the present disclosure. The method for controlling the handwriting board device is applicable to the handwriting board device in above embodiments. In some embodiments, the handwriting board device is the handwriting board device in FIG. 9. The method for controlling the handwriting board device includes the following steps.

In S1001, in the case that liquid crystal handwriting board is in an erasing mode, position information of a region to be erased in a liquid crystal panel in the liquid crystal handwriting board is acquired by a position determination assembly, and the position information of the region to be erased is sent to a drive assembly.

In the embodiments of the present disclosure, the liquid crystal handwriting board is controlled to be in the erasing mode by a toggling switch.

In S1002, a pixel voltage is applied, based on the position information of the region to be erased, to a pixel electrode in the region to be erased by the drive assembly, such that a voltage difference is developed between the pixel electrode in the region to be erased and a common electrode.

In summary, in the method for controlling the handwriting board device in the embodiments of the present disclosure, the drive assembly electrically connected to the liquid crystal panel applies, based on position information of a region to be erased, a pixel voltage to a pixel electrode in the region to be erased in the case that the liquid crystal handwriting board is in an erasing mode, such that a voltage difference is developed between the pixel electrode in the region to be erased and the common electrode. Thus, the liquid crystal molecules in the region to be erased in the liquid crystal layer rearrange under the action of the voltage difference. As such, a local region of the liquid crystal handwriting board is erased, and the flexibility of the liquid crystal handwriting board in use is improved.

In some embodiments, the method for controlling the handwriting board device further includes the following steps.

In step B1, the position determination assembly is controlled to stop acquiring the position information of the region to be erased in the liquid crystal panel in the case that the liquid crystal handwriting board is in a writing mode.

In the embodiments of the present disclosure, switching of the liquid crystal handwriting board between the erasing mode and the writing mode is controlled by the toggling switch.

In step B2, a pixel voltage is applied to all pixel electrodes by the drive assembly in the case that the liquid crystal handwriting board is in an entire plane erasing mode, such that voltage differences are developed between all pixel electrodes in the region to be erased and the common electrode.

It is further noted that in the case that the liquid crystal handwriting board is in the entire plane erasing mode, it is necessary to control the position determination assembly to stop acquiring the position information of the region to be erased in the liquid crystal panel.

It is obvious for those skilled in the art that to understand that, above specific operation principles of the method for controlling the handwriting board device are referred to corresponding process in the structure of the handwriting board device in above embodiments for convenient and simply description, which is not repeated herein.

It is noted that in the accompanying drawings, the sizes of the layers and regions are exaggerated for clear illustration. In addition, it is understood that when an element or a layer is disposed "on" another element or layer, the element is directly disposed on the another element or there is an intervening layer. In addition, it is understood that when an element or a layer is disposed "under" another element or layer, the element is directly disposed under the another element or there are more than one intervening layer or element. In addition, it is further understood that when a layer or an element is disposed "between" two layers or elements, the layer or element is the only one layer between the two layers or elements or there are more than one intervening layer or element. Similar reference numerals indicate similar elements throughout the present disclosure.

In the context, the term "the same layer" refers to a relationship of layers simultaneously formed in one step. In some embodiments, in the case that the gate line and the secondary electrode line are formed by performing one or more steps of the same pattern process, they are in the same layer. In other embodiments, the gate line and the secondary electrode line are formed in the same layer by simultaneously performing the steps of forming the gate line and the secondary electrode line. The term "the same layer" does not always indicate that the thicknesses of the layer or the layers in a cross-section view are the same.

In the present disclosure, the terms "first" and "second" are used to descriptive purposes, and are not construed to indicate or imply relative importance. Unless expressly limited otherwise, the term "a plurality of" refers to two or more.

Described above are example embodiments of the present disclosure, and are not intended to limit the present disclosure. Any modifications, equivalent replacements, improvements and the like made within the spirit and principles of the present disclosure are included within the scope of protection of the present disclosure.

What is claimed is:

1. A liquid crystal handwriting board, comprising: a liquid crystal panel, and a drive assembly electrically connected to the liquid crystal panel;
   wherein
     the liquid crystal panel comprises: a first substrate and a second substrate that are opposite to each other, and a liquid crystal layer disposed between the first substrate and the second substrate, wherein the first substrate comprises a plurality of bulk pixel electrodes, and the second substrate comprises a planar common electrode; and
     the drive assembly is configured to apply, based on position information of a region to be erased, a pixel voltage to a pixel electrode in the region to be erased in the case that the liquid crystal handwriting board is in an erasing mode, such that a voltage difference is developed between the pixel electrode in the region to be erased and the common electrode, wherein the first substrate further comprises a second planarization layer disposed on the pixel electrode;
   wherein the first substrate further comprises: a plurality of thin-film transistors electrically connected to the drive assembly, wherein the pixel electrode is electrically connected to at least one of the plurality of thin-film transistors;
   wherein the first substrate further comprises a first planarization layer disposed on the at least one thin-film transistor.

2. The liquid crystal handwriting board according to claim 1, wherein the at least one thin-film transistor comprises: a first electrode and a second electrode, wherein the first electrode comprises a U-shaped structure, the second electrode comprises a strip-shaped structure, one end of the second electrode is disposed within the U-shaped structure, and the other end of the second electrode is electrically connected to the pixel electrode.

3. The liquid crystal handwriting board according to claim 2, wherein
   the first substrate further comprises: a first base, wherein both the thin-film transistor and the pixel electrode are disposed on the first base; and
   the thin-film transistor further comprises: a gate, an active layer pattern, and a gate insulation layer, wherein the gate is disposed on a side, proximal to the first base, of the active layer pattern, the gate insulation layer is disposed between the gate and the active layer pattern, both the first electrode and the second electrode are disposed on a side, distal from the first base, of the active layer pattern, and both the first electrode and the second electrode are in contact with the active layer pattern.

4. The liquid crystal handwriting board according to claim 3, wherein the first substrate further comprises: a data line and a gate line that are disposed on the first base and provided with extension directions intersected with each other, wherein the data line is electrically connected to the first electrode, the gate line is electrically connected to the gate, and both the data line and the gate line are electrically connected to the drive assembly.

5. The liquid crystal handwriting board according to claim 4, wherein the first substrate further comprises: a secondary electrode line disposed on the first base and in a same layer as the gate line, wherein an extension direction of the secondary electrode line is consistent with the extension direction of the gate line.

6. The liquid crystal handwriting board according to claim 3, wherein the pixel electrode is disposed on the first planarization layer and is in contact with the first planarization layer, a via hole is disposed in the first planarization layer, and the pixel electrode is electrically connected to the second electrode via the via hole.

7. The liquid crystal handwriting board according to claim 1, wherein the liquid crystal panel further comprises a spacer disposed between the first substrate and the second substrate.

8. The liquid crystal handwriting board according to claim 1, wherein the liquid crystal layer comprises bistable liquid crystal molecules.

9. A handwriting board device, comprising: a liquid crystal handwriting board, and a position determination assembly;
wherein the liquid crystal handwriting board comprises: a liquid crystal panel, and a drive assembly electrically connected to the liquid crystal panel;
wherein
the liquid crystal panel comprises: a first substrate and a second substrate that are opposite to each other, and a liquid crystal layer disposed between the first substrate and the second substrate, wherein the first substrate comprises a plurality of bulk pixel electrodes, and the second substrate comprises a planar common electrode;
the drive assembly is configured to apply, based on position information of a region to be erased, a pixel voltage to a pixel electrode in the region to be erased in the case that the liquid crystal handwriting board is in an erasing mode, such that a voltage difference is developed between the pixel electrode in the region to be erased and the common electrode; and
the position determination assembly is configured to be electrically connected to the drive assembly in the liquid crystal handwriting board and acquire the position information of the region to be erased in the liquid crystal panel in the liquid crystal handwriting board, and send the position information of the region to be erased to the drive assembly, wherein the first substrate further comprises a second planarization layer disposed on the pixel electrode;
wherein the first substrate further comprises: a plurality of thin-film transistors electrically connected to the drive assembly, wherein the pixel electrode is electrically connected to at least one of the plurality of thin-film transistors;
wherein the first substrate further comprises a first planarization layer disposed on the at least one thin-film transistor.

10. The handwriting board device according to claim 9, further comprising: a toggling switch electrically connected to the position determination assembly; wherein
the toggling switch is configured to control switching of the liquid crystal handwriting board between the erasing mode and a writing mode; and
the position determination assembly is further configured to stop acquiring the position information of the region to be erased in the liquid crystal panel in the case that the liquid crystal handwriting board is in the writing mode.

11. The handwriting board device according to claim 9, wherein the position determination assembly comprises an infrared sensor.

12. A method for controlling a handwriting board device, applicable to the handwriting board device as defined in claim 9, the method comprising:
acquiring, in the case that a liquid crystal handwriting board is in an erasing mode, position information of a region to be erased in a liquid crystal panel in the liquid crystal handwriting board by a position determination assembly, and sending the position information of the region to be erased to a drive assembly; and
applying, based on the position information of the region to be erased, a pixel voltage to a pixel electrode in the region to be erased by the drive assembly, such that a voltage difference is developed between the pixel electrode in the region to be erased and a common electrode.

13. The method according to claim 12, further comprising:
controlling the position determination assembly to stop acquiring the position information of the region to be erased in the liquid crystal panel in the case that the liquid crystal handwriting board is in a writing mode.

14. The handwriting board device according to claim 9, wherein the thin-film transistor comprises: a first electrode and a second electrode, wherein the first electrode comprises a U-shaped structure, the second electrode comprises a strip-shaped structure, one end of the second electrode is disposed within the U-shaped structure, and the other end of the second electrode is electrically connected to the pixel electrode.

15. The handwriting board device according to claim 14, wherein
the first substrate further comprises: a first base, wherein both the thin-film transistor and the pixel electrode are disposed on the first base; and
the thin-film transistor further comprises: a gate, an active layer pattern, and a gate insulation layer, wherein the gate is disposed on a side, proximal to the first base, of the active layer pattern, the gate insulation layer is disposed between the gate and the active layer pattern, both the first electrode and the second electrode are disposed on a side, distal from the first base, of the active layer pattern, and both the first electrode and the second electrode are in contact with the active layer pattern.

16. The handwriting board device according to claim 15, wherein the first substrate further comprises: a data line and a gate line that are disposed on the first base and provided with extension directions intersected with each other, wherein the data line is electrically connected to the first electrode, the gate line is electrically connected to the gate, and both the data line and the gate line are electrically connected to the drive assembly.

17. The handwriting board device according to claim 16, wherein the first substrate further comprises: a secondary electrode line disposed on the first base and in a same layer as the gate line, wherein an extension direction of the secondary electrode line is consistent with the extension direction of the gate line.

18. The liquid crystal handwriting board according to claim 1, wherein there is only one liquid crystal layer between the first substrate and the second substrate, and the second planarization layer is provided between the pixel electrode of the second substrate and the liquid crystal layer.

* * * * *